United States Patent
Hou et al.

(10) Patent No.: US 11,026,278 B2
(45) Date of Patent: Jun. 1, 2021

(54) METHOD OF PROCESSING A RECEIVED CHANNEL SIGNAL IN A DEVICE TO DEVICE COMMUNICATIONS LINK

(71) Applicant: Hong Kong Applied Science and Technology Research Institute Co., Ltd., Shatin (HK)

(72) Inventors: Yun Hou, Tai Po (HK); Yuyi Mao, Tai Wai (HK); Eddy Chiu, Kowloon (HK); Xiangyu Liu, Shenzhen (CN); Yaming Luo, Kowloon (HK); Man Wai Kwan, Shatin (HK); Kong Chau Eric Tsang, KLN (HK)

(73) Assignee: HongKong Applied Science and Technology Research Institute Company Limited, Shatin (HK)

( * ) Notice: Subject to any disclaimer, the term of this patent is extended or adjusted under 35 U.S.C. 154(b) by 0 days.

(21) Appl. No.: 16/561,710

(22) Filed: Sep. 5, 2019

(65) Prior Publication Data

US 2021/0076433 A1    Mar. 11, 2021

(51) Int. Cl.
*H04W 76/14* (2018.01)
*H04L 25/02* (2006.01)
(Continued)

(52) U.S. Cl.
CPC .......... *H04W 76/14* (2018.02); *H04L 5/0007* (2013.01); *H04L 25/0224* (2013.01); *H04W 56/0045* (2013.01)

(58) Field of Classification Search
CPC ........................ H04W 76/14; H04W 56/0045; H04L 5/0007; H04L 25/0224
(Continued)

(56) References Cited

U.S. PATENT DOCUMENTS 9,001,812 B2    4/2015    Yu et al.
10,165,502 B2   12/2018   Tong et al.
(Continued)

FOREIGN PATENT DOCUMENTS

CN    WO2017193972 A1    11/2017
EP        3322234 A1      5/2018

OTHER PUBLICATIONS

PCT/CN2019/104805; International Search Report and Written Opinion, dated May 27, 2020.

*Primary Examiner* — Yemane Mesfin
*Assistant Examiner* — Intekhaab A Siddiquee

(57) ABSTRACT

Described is a method of decoding a physical sidelink shared channel (PSSCH) involving physical sidelink control channel (PSCCH) resource grid search space reduction, timing offset (TO) estimation, and reference symbol identification. Resource grid search space reduction may include identifying resource blocks (RBs) having a signal power below a first threshold such that said RBs can be excluded from further processing. Search space reduction may additionally or alternatively include identifying RB pairs where a difference in signal power between the RBs comprising each pair of RBs is above a second threshold and excluding any such said RB pairs from further processing. TO compensation may include circularly correlating TO-compensated received DMRSs and their corresponding local DMRSs to obtain energy or power profiles. From the energy/power profiles, a subset L of highest stored power values and their corresponding cyclic shift ($n_{cs}$) values can be chosen where said power values are equal to or exceed a third threshold. The selected subset L can be made available for use in a decoding process for a received channel signal.

21 Claims, 8 Drawing Sheets

(51) Int. Cl.
*H04L 5/00* (2006.01)
*H04W 56/00* (2009.01)

(58) Field of Classification Search
USPC .......................................................... 370/329
See application file for complete search history.

(56) References Cited

U.S. PATENT DOCUMENTS

| | | |
|---|---|---|
| 2013/0034070 A1* | 2/2013 | Seo ...................... H04L 5/0082 370/329 |
| 2017/0093538 A1* | 3/2017 | Yoon ..................... H04L 5/0048 |
| 2017/0230926 A1* | 8/2017 | Seo ...................... H04J 11/0073 |
| 2018/0332491 A1* | 11/2018 | Eckardt ................. H04W 76/14 |
| 2019/0173612 A1 | 6/2019 | Kimura et al. |
| 2019/0174545 A1 | 6/2019 | Li et al. |
| 2019/0200370 A1 | 6/2019 | Yang et al. |
| 2020/0059943 A1* | 2/2020 | Ren ................... H04W 72/1226 |

\* cited by examiner

US 11,026,278 B2

METHOD OF PROCESSING A RECEIVED CHANNEL SIGNAL IN A DEVICE TO DEVICE COMMUNICATIONS LINK

FIELD OF THE INVENTION

The invention relates generally to device to device wireless communication and, more specifically, but not exclusively, to decoding signals of a channel such as a physical sidelink shared channel (PSSCH) using physical sidelink control channel (PSCCH) resource grid search space reduction, timing offset estimation and compensation of received channel signals, and demodulation reference signal (DMRS) symbol identification. The invention has particular applicability to a sidelink in a vehicle to everything (V2X) communication system.

BACKGROUND OF THE INVENTION

Sidelink is a $3^{rd}$ Generation Partnership Project (3GPP) Long-Term-Evolution (LTE) feature first introduced in 3GPP Release 12 aimed at enabling D2D communications within legacy cellular-based LTE radio access networks. Sidelink has been enriched in 3GPP Release 14 with various features. D2D is applicable to public safety and commercial communication use-cases, and recently, in 3GPP Release 14, to V2X scenarios.

Intelligent transport systems provide a framework for road users and traffic managers to share information where V2X defines the exchange of information between vehicles and other types of stations/devices, such as roadside units, infrastructure, pedestrians or other vehicles. In the V2X physical access layer, LTE-V2X uses the sidelink channel which is designed based on the LTE uplink waveform. Two sidelink modes dedicated to V2X were introduced in 3GPP Release 14: modes 3 and 4 support direct vehicular communications but differ on how stations' resources are allocated. In mode 3, vehicles are within the coverage of the cellular network, and the stations' resources are selected, allocated and reserved by the eNodeB. In contrast, mode 4 is designed to work without the requirement of being under coverage of the cellular network: resources are autonomously selected by the stations/devices without requiring the involvement of the eNodeB even if present.

The sidelink waveform design is similar to the earlier developed LTE uplink, re-using the same principles for the subframe organization. LTE-V2X is a synchronous network, where all the users have the same coarsely synchronized time reference, typically obtained from a global navigation satellite system (GNSS). Time is divided into subframes. Each LTE subframe has a length of 1 ms and contains 14 OFDM symbols. One LTE-V2X subframe comprises 4 DMRS symbols and 9 data symbols conveying the user's payload. The last symbol is not transmitted, and acts as a time guard to allow transmitters to return to receiver state before the next subframe. The first data symbol may not be available for use by the receiver as it might be used for automatic gain control (AGC) calibration purposes.

Frequency-wise, the LTE-V2X channel bandwidth is divided into a given number of subchannels. Each subchannel comprises a number of resource blocks (RBs) having 12 subcarriers. Two main physical channels are used in LTE-V2X: the PSSCHs which are used to transmit data packets, known as transport blocks (TB), and the PSCCHs which are used to transmit the associated control messages, known as sidelink control information (SCI). The PSCCH SCI and its associated PSSCH TB may be transmitted in the same subframe or different subframes.

PSCCH always occupies two RBs. Each of the DMRSs of a PSCCH carries a 24-sample complex valued sequence with a cyclic shift ($n_{cs}$) parameter defining how 'fast' a DMRS sequence rotates in the complex plane. PSCCH DMRSs are constant modulus symbols derived from a Zadeoff-Chu sequence in conjunction with a cyclic shift ($n_{cs}$). The cyclic shift ($n_{cs}$) value is randomly selected by the transmitter such that the receiver does not know which cyclic shift ($n_{cs}$) value has been selected. DMRSs with different cyclic shift ($n_{cs}$) values are mutually orthogonal. In V2X, the cyclic shift ($n_{cs}$) values can be 0, 3, 6 or 9. Any offset in timing of received PSCCHs violates the orthogonality condition.

For PSSCH, the number of occupied RBs depends on the user's payload size, on the subchannels division, and on the modulation and coding scheme (MCS) used.

A user equipment (UE), which can be both a transmitter and a receiver, may transmit a data packet comprising PSSCH which carries message payload; PSCCH which carries control information; and DMRSs which are the pre-defined sequences known to all receiving UEs or other receiving devices. A UE in a V2X system, such as a vehicular UE (VUE), is always receiving if not transmitting and does not know which other devices are transmitting or where data packets are located. Currently, to receive data, the receiving UE needs to blindly search in the PSCCH resource grid search space and then decode the corresponding PSSCH to obtain the data. The entire search space may need to be searched. The PSCCH detecting efficiency is therefore low. In some applications such as, for example, a V2X system, the receiving UE is required to accurately decode a certain or defined number of PSSCH payloads as soon as possible for obtaining critical messages.

In V2X, a VUE is required to detect PSCCHs from up to 10 transmitting VUEs in each subframe without prior information as to how many PSCCHs there are and the used radio resources of the received PSCCHs and to decode the associated PSSCH payloads as quickly as possible. As each PSCCH spans 2 RBs, normally a consecutive RB pair, in the resource grid and there are at most M possible RB candidate pairs where M=46 for a 10 MHz bandwidth and M=96 for a 20 MHz bandwidth, in a worst case scenario a VUE may have to blindly search and detect X·M PSCCHs where X is the number of possible cyclic shift ($n_{cs}$) options for each PSCCH DMRS. In the case of V2X, X=4. This blind processing is computationally very expensive and time consuming and is thus undesirable in at least the V2X environment.

WO2017/193972 (also published as US2019/0200370) discloses a method for determining priority of a resource comprising: processing a physical sidelink control channel (PSCCH) by means of performing energy detection to obtain a detected result, and performing information decoding to obtain a decoded result; and weighting at least one of the detected result and the decoded result to determine the priority of a PSCCH resource.

U.S. Ser. No. 10/165,562 discloses a blind detection method and system for a physical downlink control channel (PDCCH). The method involves obtaining PDCCH data. The PDCCH data is used according to location identifier of resource element for a packet. A soft bit data of a control channel unit is obtained according to the PDCCH data. DCI data is confirmed according to the soft bit data of the CCE. A random-access wireless network temporary identifier is obtained according to the DCI data. The PDCCH blind detection is performed based on the random-access wireless network temporary identifier.

U.S. Pat. No. 9,001,812 discloses a timing offset/error estimate (TOE) method, e.g., for an LTE uplink (UL) receiver by using the equation:

$$\tilde{\tau}_L = \frac{N}{2\pi L} \cdot (\iota P'_{k-L} - \iota P'_k)$$

where L is the subcarrier separation. TO estimation quality is improved by taking an average of $\tilde{\tau}_L$ using different values of L.

US2018/0332491 discloses a method to detect a sidelink identification by performing a series of correlations using the DMRS and a set of demodulation reference templates stored in the memory component of a UE.

What is desired is a method including reducing the PSCCH resource grid search space to improve PSCCH detection efficiency and ensure high detection accuracy.

OBJECTS OF THE INVENTION

An object of the invention is to mitigate or obviate to some degree one or more problems associated with known methods of searching in the PSCCH resource grid search space and detecting the corresponding PSCCHs to then decode the received channel signal to obtain the PSSCH data.

The above object is met by the combination of features of the main claims; the sub-claims disclose further advantageous embodiments of the invention.

Another object of the invention is to detect PSCCHs without using a decoding process.

Another object of the invention is to pre-screen PSCCHs and only detect the most likely PSCCH candidates using the most likely cyclic shift ($n_{cs}$) values.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method of decoding a physical sidelink shared channel (PSSCH) involving physical sidelink control channel (PSCCH) resource grid search space reduction, timing offset (TO) estimation and compensation, and reference symbol identification. Resource grid search space reduction may include identifying RBs having a signal power below a first threshold such that said RBs can be excluded from further processing. Search space reduction may additionally or alternatively include identifying RB pairs where a difference in signal power between the RBs comprising a pair of RBs is above a second threshold and excluding any such said RB pairs from further processing. TO compensation may include circularly correlating TO-compensated received DMRSs and corresponding local DMRSs to obtain energy or power profiles. From the energy/power profiles, a subset L of highest stored power values and their corresponding cyclic shift ($n_{cs}$) values can be chosen where said power values are equal to or exceed a third threshold. The selected subset L can be made available for use in a decoding process for the received PSSCH channel signal.

In a first main aspect, the invention provides a method of processing a received channel signal, the method comprising performing one or both of the following sets of steps (a) and (b): where the set of steps (a) comprises: (i) determining a signal power for a resource block (RB) in a resource grid; (ii) comparing the determined signal power for said RB with a selected, calculated or predetermined first threshold ($Th_0$); (iii) identifying RBs in the resource grid having a determined signal power less than the first threshold ($Th_0$) and excluding any such RBs from further processing; and where the set of steps b comprises: (i) selecting candidate pairs of RBs in the resource grid; (ii) determining a signal power for each RB in each candidate RB pair in the resource grid; (iii) for each candidate RB pair in the resource grid, determining a difference in signal power between the RBs comprising the pair of RBs; (iv) comparing the determined difference in signal power between the RBs comprising the pair of RBs with a selected, calculated or predetermined second threshold ($Th_1$); (v) identifying any candidate RB pair where the determined difference in signal power between the RBs comprising the pair of RBs is greater than the second threshold ($Th_1$) and excluding any such candidate RB pair from further processing.

In a second main aspect, the invention provides a device for processing a received channel signal, the device comprising: a receiver configured to receive channel signals, wherein the channel signals include control channel data blocks of a control channel; and a signal detection module configured for detecting control channel blocks of the control channel, wherein the signal detection module includes machine readable instructions stored in a memory and which are executable by a processor to perform one or both of the foregoing sets of steps (a) and (b).

In a third main aspect, the invention provides a user equipment (UE) for processing a received channel signal, the UE comprising: a receiver configured to receive channel signals, wherein the channel signals include control channel data blocks of a control channel; and a signal detection module configured for detecting control channel blocks of the control channel, wherein the signal detection module includes machine readable instructions stored in a memory and which are executable by a processor to perform one or both of the foregoing sets of steps (a) and (b).

In a fourth main aspect, the invention provides a method of processing a received channel signal, the method comprising, for each admitted candidate RB pair in a resource grid, where an admitted candidate RB pair preferably comprises an RB pair where a determined difference in signal power between the RBs comprising the pair of RBs is less than or equal to a predetermined, selected or calculated threshold ($Th_1$), the steps of: performing timing offset (TO) estimation based on a selected number of different local DMRS ($l_0$, $l_3$, $l_6$, and $l_9$) with a corresponding number of cyclic shifts ($n_{cs}$=0, 3, 6, 9) to provide estimated TOs ($\hat{to}_0$, $\hat{to}_3$, $\hat{to}_6$, and $\hat{to}_9$); performing TO compensation using the estimated TOs ($\hat{to}_0$, $\hat{to}_3$, $\hat{to}_6$, and $\hat{to}_9$) to provide TO-compensated received DMRSs ($\tilde{y}_0$, $\tilde{y}_3$, $\tilde{y}_6$, and $\tilde{y}_9$); and circularly correlating the TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$); and optionally the further steps of: obtaining normalized energy profiles ($z_0$, $z_3$, $z_6$, and $z_9$) for the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$); and, for each normalized energy profile ($z_0$, $z_3$, $z_6$, and $z_9$), performing the steps of: identifying a maximum peak of said normalized energy profile; comparing a power value of said maximum peak with a selected, calculated or predetermined threshold ($Th_2$); and, if the power value of said maximum peak is greater than or equal to said threshold ($Th_2$), making said power value of said maximum peak in association with its corresponding cyclic shift ($n_{cs}$) value available to a process for decoding the received channel signal.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
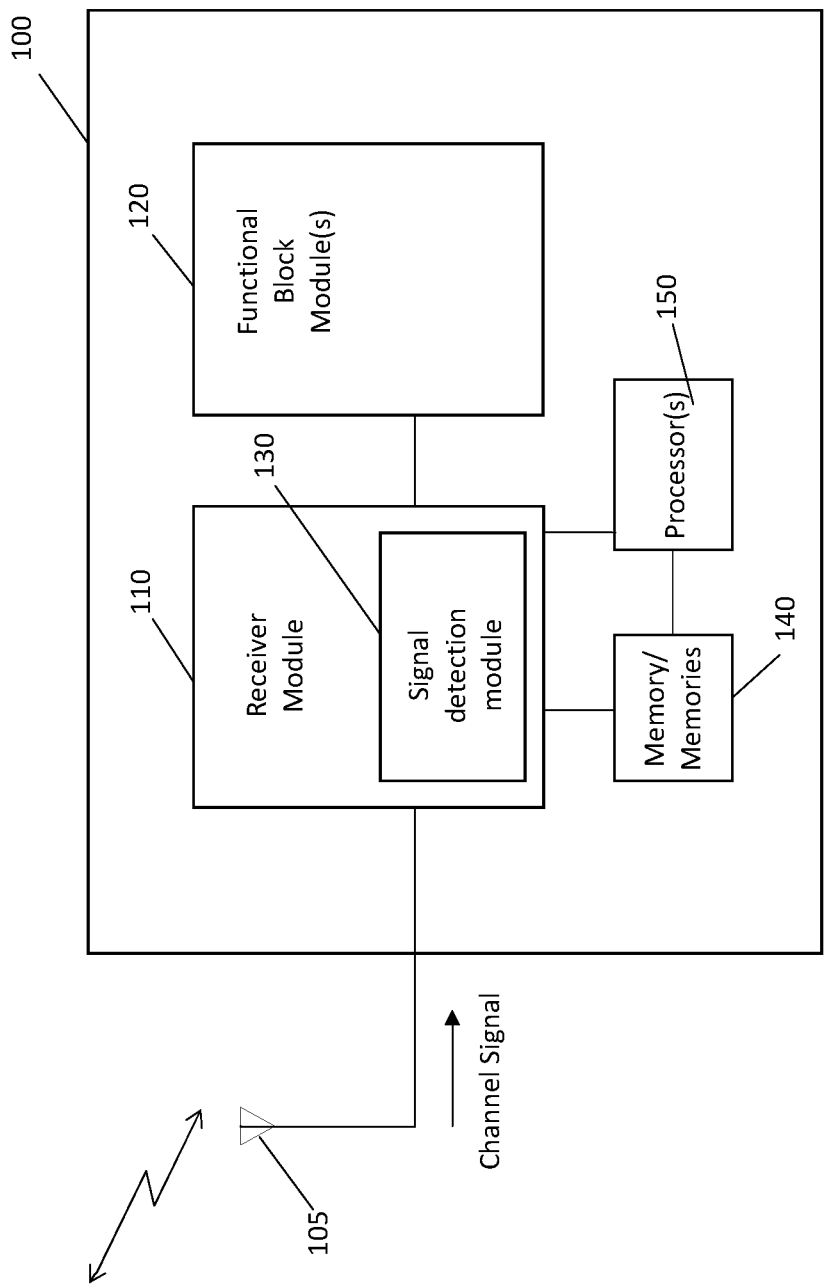
FIG. 1 is a block schematic diagram of a channel signal processing device in accordance with the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention relates to device to device wireless communication and to a method for PSCCH search space reduction comprising prescreening the PSCCH search space for PSCCH candidates using energy detection, timing offset (TO) estimation/compensation of received channel signals, identifying DMRSs and choosing PSCCH candidates based on the DMRS identification results for decoding the received channel signals. The invention has particular applicability to a vehicle to everything (V2X) communication system.

FIG. 1 shows an exemplary embodiment of a channel signal processing device 100 in accordance with concepts of the present invention. In the illustrated embodiment, processing device 100 comprises communication equipment such as a handset device, a UE, a network node, a V2X unit (e.g. a vehicular UE (VUE) or a roadside unit), etc. operating in a V2X environment such as, but not limited to a wireless network, e.g. a wireless cellular network. The wireless cellular network may comprise a 4G cellular network. It will be appreciated, however, that the concepts of the invention are not limited to use in a V2X environment. It will also be appreciated that the concepts of the invention do not require the presence or operation of an eNodeB in the communications network.

The processing device 100 may comprise a plurality of functional blocks for performing various functions thereof. For example, the processing device 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of a received channel signal in accordance with the invention. Channel signals may be received via an antenna module 105. Furthermore, the receiver module 110 is configured to process and/or decode a received channel signal when transmitting station identifier information is not known or, more particularly, is not provided as is typically the case in a sidelink of a V2X system.

Although the signal detection module 130 is shown as being deployed as part of the receiver module 110 (e.g. comprising a portion of the receiver module control and logic circuits), there is no limitation to such a deployment configuration according to the concepts of the invention. For example, the signal detection module 130 may be deployed as a functional block of processing device 100 that is distinct from, but connected to, receiver module 110. The signal detection module 130 may, for example, be implemented using logic circuits and/or executable code/machine readable instructions stored in a memory 140 of the processing device 100 for execution by a processor 150 to thereby perform functions as described herein. For example, the executable code/machine readable instructions may be stored in one or more memories 140 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g. application specific integrated circuit (ASIC), field programmable gate array (FPGA), graphics processing unit (GPU), and/or the like configured to perform functions of the signal detection module 130 as described herein.

As described in greater detail below, the signal detection module 130 is configured to implement PSCCH resource grid search space reduction, timing offset estimation and compensation of received channel signals, and DMRS symbol identification.

Whilst the following description makes reference to a LTE-V2X network by way of example, it will be understood that the concepts of the invention are applicable to New Radio (NR), i.e. 5G, networks and particularly, although not exclusively, to the LTE-V2X evolutions of 3GPP Release 15 to support, for example, 5G-V2X communications and autonomous vehicles' applications.

LTE-V2X channel bandwidth is divided into a given number of subchannels. Each subchannel has a number of resource blocks (RBs) having 12 subcarriers. The two main physical channels used in LTE-V2X comprise the PSSCHs which are used to transmit data packets in transport blocks (TB) and the PSCCHs which are used to transmit the associated SCI. The PSCCH SCI and its associated PSSCH TB may be transmitted in the same subframe or different subframes.

PSCCH always occupies two RBs. The DMRSs of a PSCCH carry a 24-sample complex valued sequence with a cyclic shift ($n_{cs}$) parameter defining how 'fast' a DMRS sequence rotates in the complex plane. The cyclic shift ($n_{cs}$) value is randomly selected by the transmitter such that the receiver does not know which cyclic shift ($n_{cs}$) value has been selected. DMRSs with different cyclic shift ($n_{cs}$) values are mutually orthogonal. In V2X, there are four possible cyclic shift ($n_{cs}$) values, i.e. $n_{cs}$=0, 3, 6 or 9.

In V2X, a VUE is required to detect PSCCHs from up to 10 transmitting VUEs in each subframe without prior information as to how many PSCCHs there are and the used radio resources of the received PSCCHs and to decode the associated PSSCH payloads as quickly as possible. Each PSCCH spans 2 RBs, normally a consecutive RB pair, in the resource grid and there are at most M possible RB candidate pairs where M=46 for a 10 MHz bandwidth and M=96 for a 20 MHz bandwidth. In a worst-case scenario, a VUE may have to blindly search and detect 4M PSCCHs as there are four possible cyclic shift ($n_{cs}$) options for each PSCCH DMRS.

Figure 2:
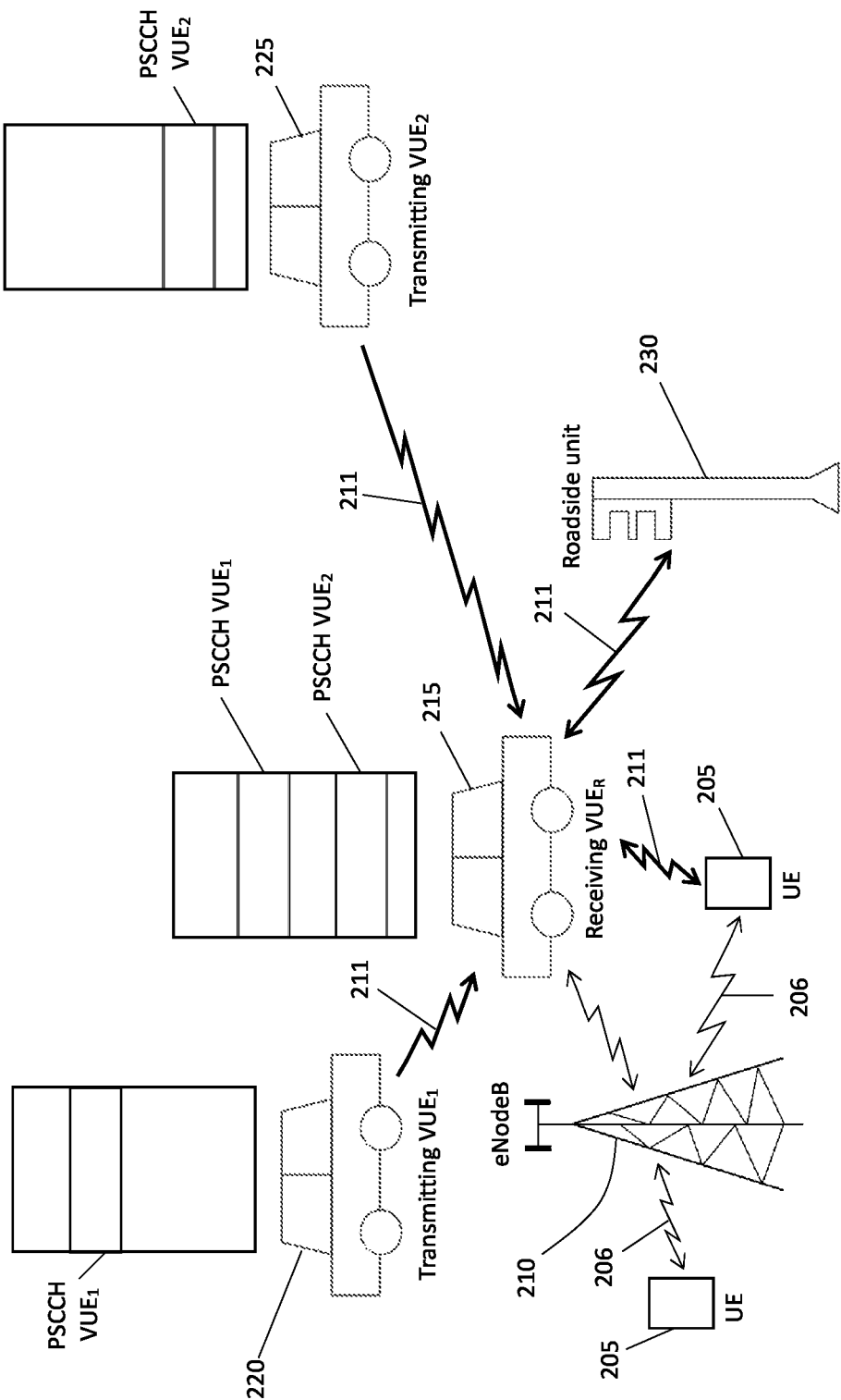
FIG. 2 is an illustration of an LTE-V2X network in which the concepts of the present invention can be implemented.

Referring to FIG. 2, in a legacy uplink/downlink LTE network scenario, two UEs 205 normally communicate through wireless links 206 using the LTE "Uu" interface and data are always traversing the LTE eNodeB 210. In contrast, a sidelink 211 enables direct communication between proximal UEs including VUEs ($VUE_R$, $VUE_1$, $VUE_2$) 215, 220, 225 using the "PC5" interface, and data does not need to go through the eNodeB 210. It will be understood that in the V2X network of FIG. 2, all of the devices including UEs 205, VUEs 215, 220, 225 and roadside unit(s) 230 may communicate via sidelinks 211 thereby negating the involvement of the eNodeB 210.

In the example of FIG. 2, which is provided merely by way of illustration, $VUE_R$ 215 receives channel signals (PSSCH/PSCCH) from at least $VUE_1$ 220 and $VUE_2$ 225. As illustrated, $VUE_1$ 220 is located closer to $VUE_R$ 215 than $VUE_2$ 225 such that the signal strength of $VUE_1$ 220 at $VUE_R$ 215 is greater than the signal strength of $VUE_2$ 225 at $VUE_R$ 215. This can be better understood by reference to FIG. 4 where it can be seen that the signal powers of the RBs for VUE$_1$ 220 at VUE$_R$ 215 are stronger than the signal powers of the RBs for VUE$_2$ 225 at VUE$_R$ 215.

Figure 3:
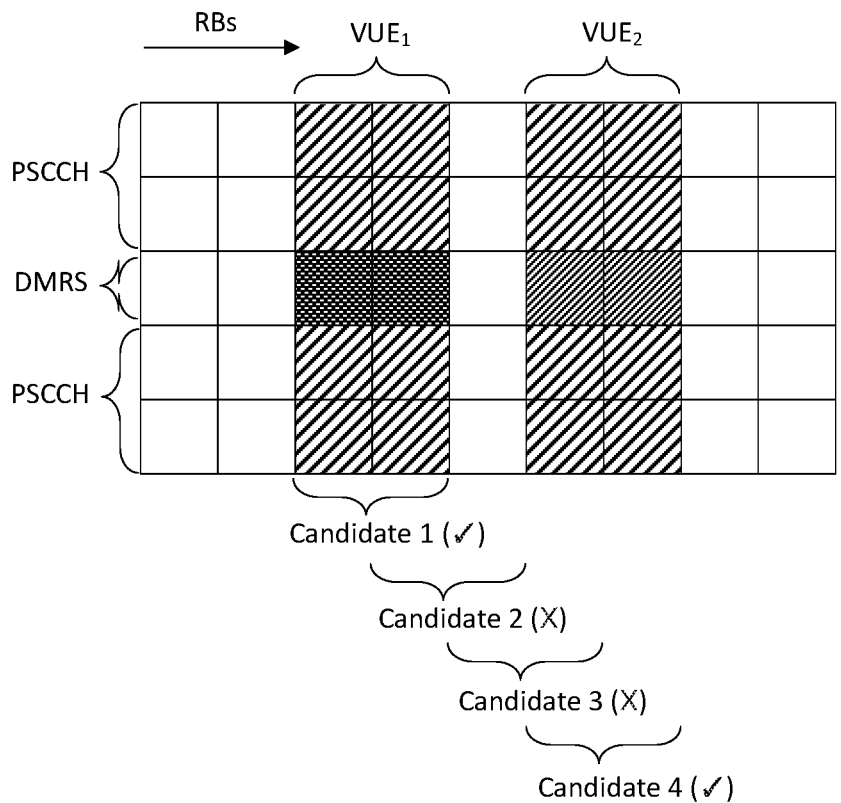
FIG. 3 is a diagram illustrating a PSCCH resource grid space with candidate RB pairs.

FIG. 3 shows the RB resource grid for VUE$_R$ 215 identifying the channel signals (PSCCH RBs) received at VUE$_R$ 215 from VUE$_1$ 220 and VUE$_2$ 225.

Figure 4:
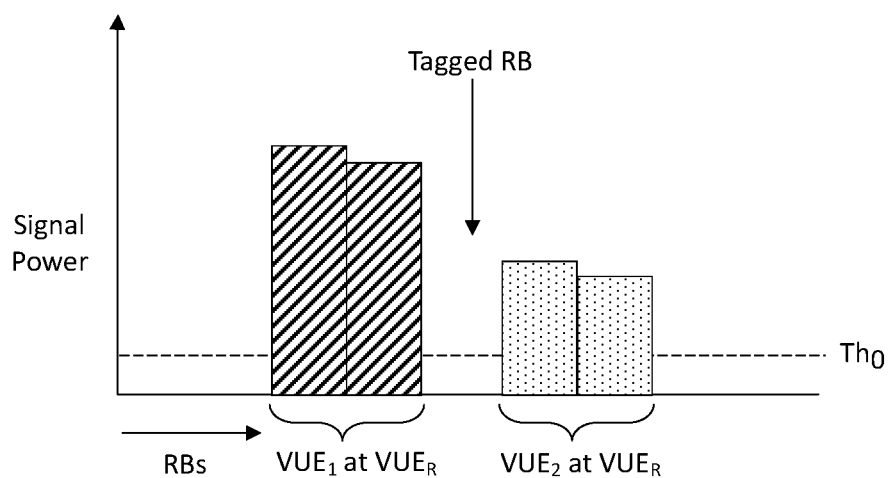
FIG. 4 is a diagram illustrating a first method of PSCCH resource grid space reduction in accordance with the present invention.
Figure 8:
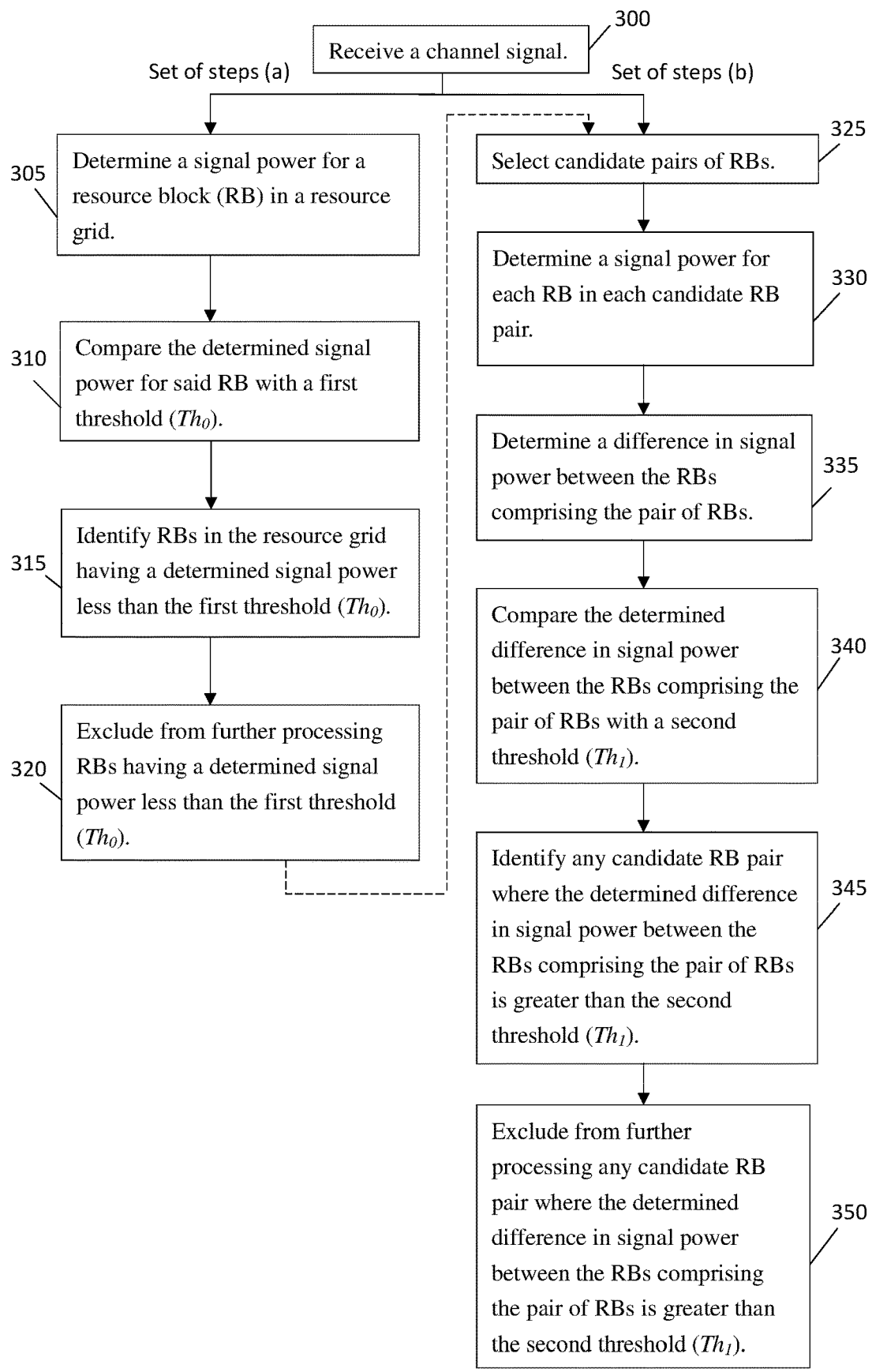
FIG. 8 is a flow diagram illustrating the first and second methods of PSCCH resource grid space reduction in accordance with the present invention.

In a first method of PSCCH resource grid space reduction in accordance with the invention as illustrated by the set of steps (a) of FIG. 8, the method comprises a first common step 300 of receiving at the channel signal processing device 100 one of more channel signals such as PSCCHs. As illustrated in FIG. 3, the received PSCCHs occupy pairs of RBs within the resource grid. In this example, some of the RBs in the resource grid are not utilized. The first PSCCH space reduction method includes a next step 305 of using the signal receiver module 110 and/or signal detection module 130 to determine a signal power for each RB in the resource grid. A next step 310, as illustrated in FIG. 4, involves comparing the determined signal power for each RB with a selected, calculated or predetermined first threshold (Th$_0$). Then, in step 315, RBs in the resource grid having a determined signal power less than the first threshold (Th$_0$) are identified and/or tagged such that said RBs can, at step 320, be identified for exclusion from further processing in the methods of the invention. The first threshold (Th$_0$) is selected, calculated or predetermined by offline theoretical analysis, simulation analysis, on-site field tests and/or on-line adaptation. The first PSCCH space reduction method provides a computationally efficient way of significantly reducing the PSCCH search space.

Preferably, the signal power determined by the signal receiver module 110 and/or signal detection module 130 for the RBs is determined at each RB's DMRS and preferably further is determined at orthogonal frequency division multiplexing (OFDM) symbols of said RB's DMRS. Furthermore, it is preferred that the signal power is determined only for RBs having a DMRS.

In a second method of PSCCH resource grid space reduction in accordance with the invention as illustrated by the set of steps (b) of FIG. 8, the method is based on selected candidate pairs of RBs. The second PSCCH space reduction method may be implemented alternatively to (as illustrated by FIG. 5) or in addition to (as illustrated by FIG. 6) the first PSCCH space reduction method.

Figure 5:
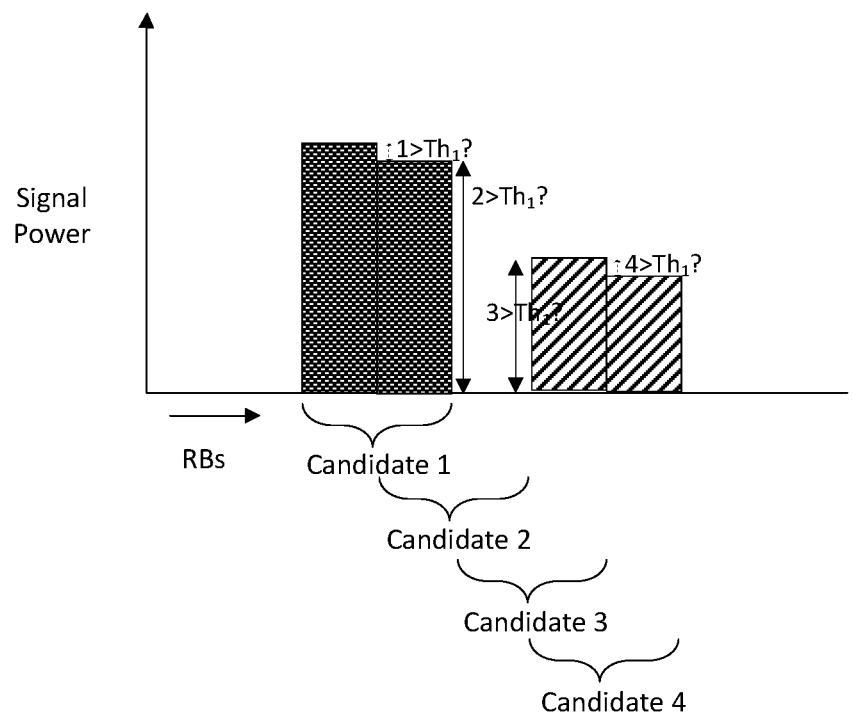
FIG. 5 is a diagram illustrating a second method of PSCCH resource grid space reduction in accordance with the present invention.

In the case illustrated by FIG. 5, there are shown four possible consecutive candidate pairs of RBs denoted as "candidate 1", "candidate 2", etc. Following the first common step 300, the first embodiment of the second PSCCH space reduction method requires, at step 325, selection of the candidate pairs of RBs. In this embodiment of the method, none of the RBs have been tagged for exclusion of further processing, i.e. the first PSCCH space reduction method as hereinbefore described has not been utilized in this case. In a next step 330, the signal receiver module 110 and/or signal detection module 130 determines a signal power for each RB in each candidate RB pair in the resource grid. Then, at step 335, a determination is made of a difference in signal power between the RBs comprising the pair of RBs. The determined differences in signal power for RBs in the candidate RB pairs is compared at step 340 to a selected, calculated or predetermined second threshold (Th$_1$). For example, a determination is made for "candidate 1" RB pair in FIG. 5 to see if the signal power difference denoted as "1" is greater than the second threshold (Th$_1$), i.e. 1>Th$_1$. For "candidate 1" RB pair, it is determined that the signal power difference between the two RBs forming said candidate pair is less than Th$_1$. Consequently, "candidate 1" RB pair is retained for further processing as is "candidate 4" RB pair, but "candidate 2" RB pair and "candidate 3" RB pair are excluded from further processing. The power signal difference comparison step 340 enables an identification at step 345 of any RB pairs where the determined difference in signal power between the RBs comprising the pair of RBs is greater than the second threshold (Th$_1$). This then leads to step 350 where any such candidate RB pairs are identified for exclusion from further processing in the methods of the invention. The second threshold (Th$_1$) is selected, calculated or predetermined by offline theoretical analysis, simulation analysis, on-site field tests and/or on-line adaptation.

Figure 6:
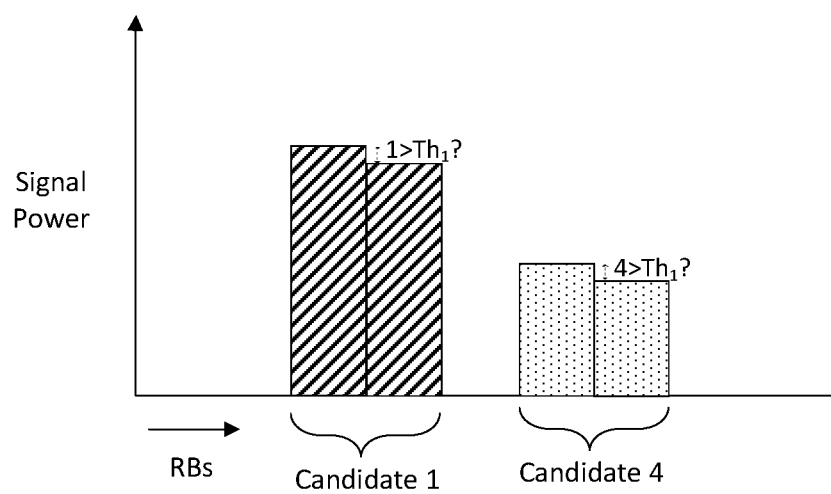
FIG. 6 is a diagram illustrating the second method of PSCCH resource grid space reduction when combined with the first method of PSCCH resource grid space reduction.

In the second embodiment of the second PSCCH space reduction method as shown in FIG. 6, the second PSCCH space reduction method (set of steps (b)) is implemented after the implementation of the first PSCCH space reduction method (set of steps (a)). This has the benefit of modifying the selection of candidate RB pairs step 325 in that, as a consequence of the first PSCCH space reduction method, some RBs have already been excluded from further processing and therefore cannot be included in the selection of candidate RB pairs for the second PSCCH space reduction method. Therefore, as shown by FIG. 6, "candidate 2" RB pair and "candidate 3" RB pair (of FIG. 5) are not considered in the second embodiment of the second PSCCH space reduction method, but "candidate 1" RB pair and "candidate 4" RB pair are selected.

Preferably, the RB candidate pairs are selected as consecutive pairs of RBs from any valid RBs, i.e. RBs that that not been excluded from further processing.

It will be noted that the first PSCCH space reduction method seeks to exclude RBs having a very low signal power at the receiver module 110 (VUE$_3$) whereas the second PSCCH space reduction method seeks to exclude RB pairs where there is a large difference in signal power between the RBs comprising said pair.

Figure 7:
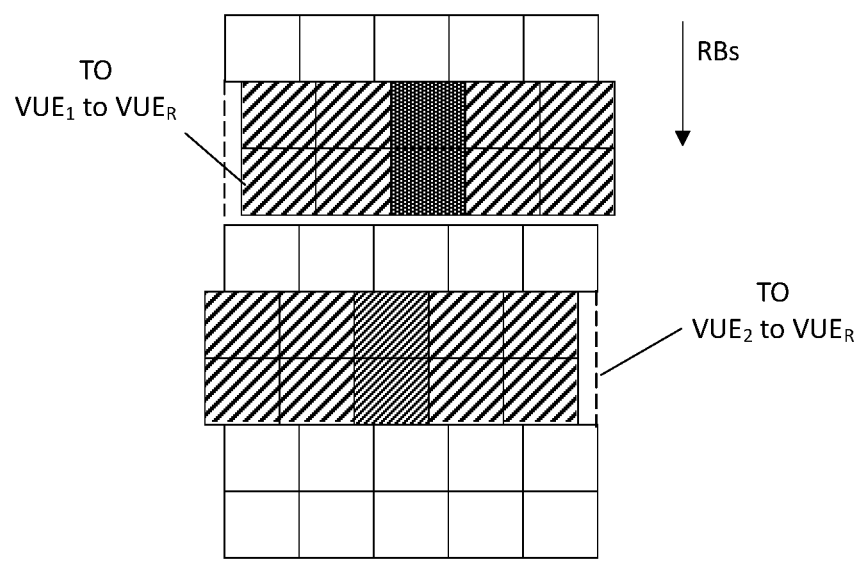
FIG. 7 is a diagram illustrating TOs between different VUEs leading to DMRS orthogonality violations.

Referring to FIG. 7 with reference to FIG. 2, a timing offset (TO) issue is illustrated whereby, due to such things as non-ideal GNSS and/or fading channels, a TO can arise at a receiver VUE. In the example network environment of FIG. 2, it is seen in FIG. 7 that there is a unique TO at VUE$_R$ with respect to VUE$_1$ and a further unique TO at VUE$_R$ with respect to VUE$_2$. The TOs between the receiver and the transmitters violate the orthogonality of the DMRSs.

Figure 9:
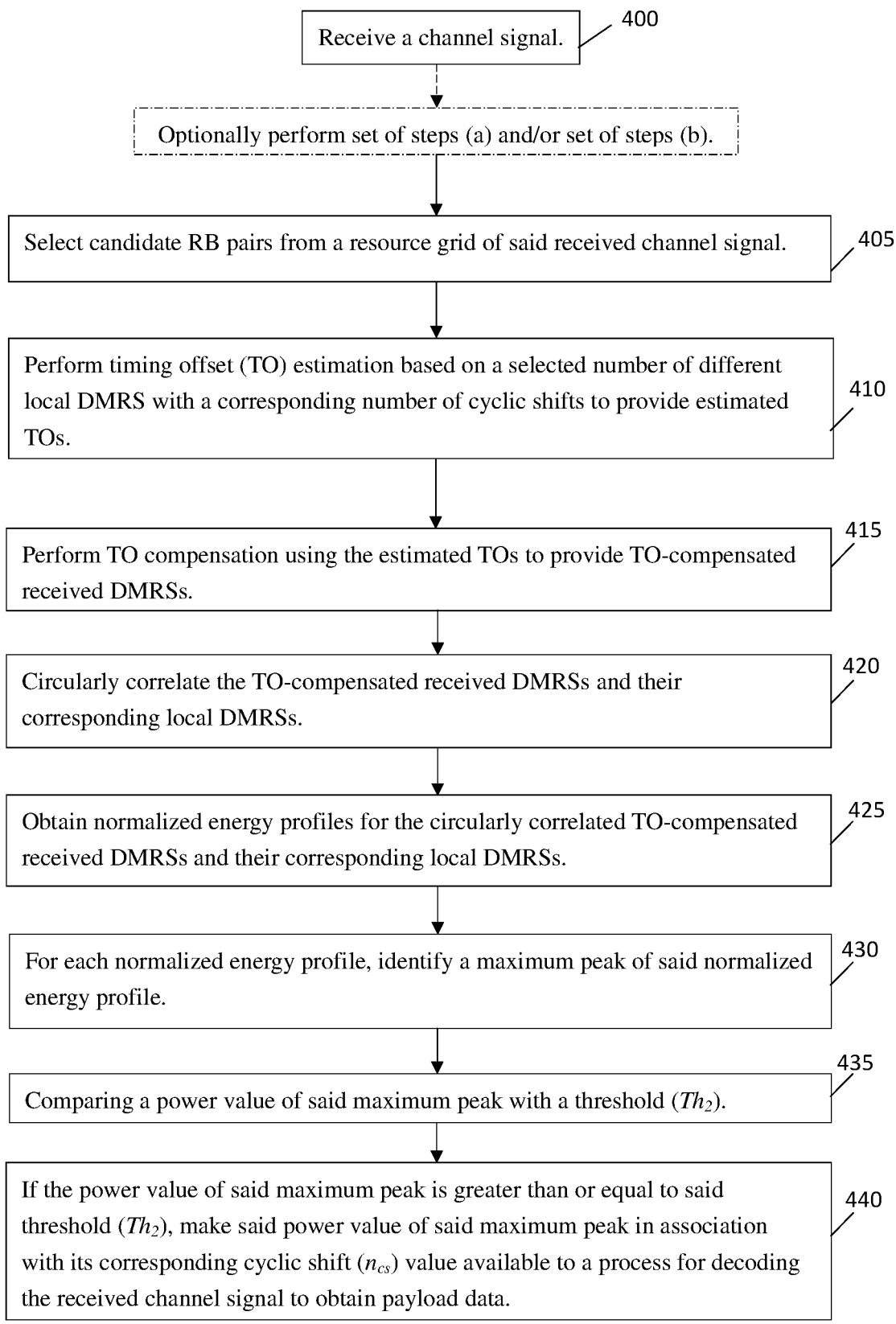
FIG. 9 is a flow diagram illustrating a first method of TO estimation and compensation in accordance with the present invention.
Figure 10:
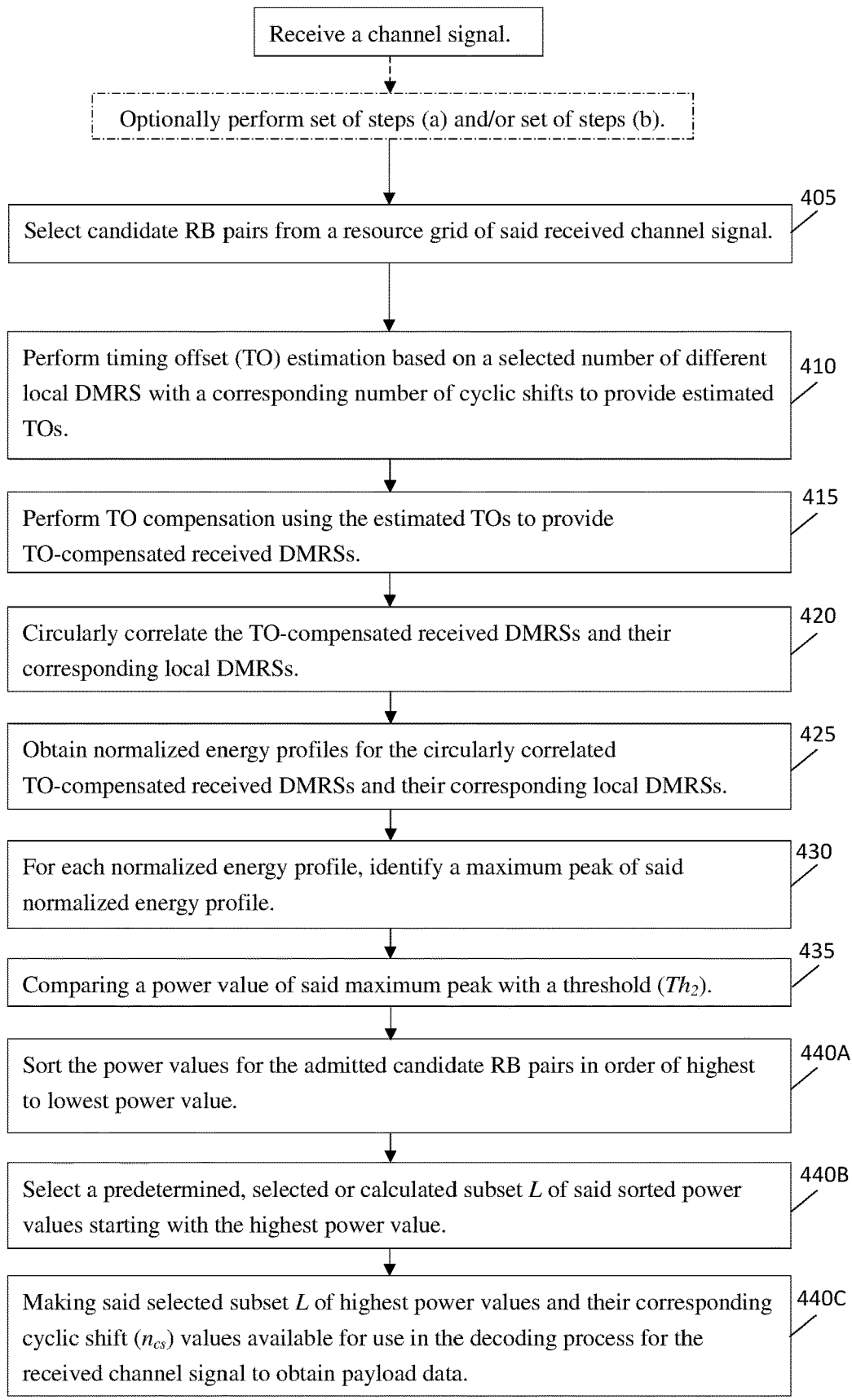
FIG. 10 is a flow diagram illustrating a second method of TO estimation and compensation in accordance with the present invention.

As shown in FIGS. 9 and 10, the present invention proposes a TO estimation and compensation method to address the issue illustrated by FIG. 7. It is strongly preferred that the TO estimation and compensation method hereinafter described is implemented after implementation of the first PSCCH space reduction method and/or the second PSCCH space reduction method such that the TO estimation and compensation is limited to admitted candidate RB pairs, where an admitted candidate RB pair comprises an RB pair where the determined difference in signal power between the RBs comprising said pair of RBs is less than or equal to the second threshold (Th$_1$). However, it is possible to implement the TO estimation and compensation method without first implementing the first PSCCH space reduction method and/or the second PSCCH space reduction method.

Having received a channel signal (PSCCH) at step 400 (FIG. 9), the signal detection module 130 is configured to select, at step 405, candidate RB pairs from the PSCCH resource grid of said received channel signal. For each selected (admitted) candidate pair, the signal detection module 130 is configured to perform, at step 410, timing offset (TO) estimation based on a selected number of different local DMRS ($l_0$, $l_3$, $l_6$, and $l_9$) with a corresponding number of cyclic shifts ($n_{cs}$=0, 3, 6, 9) to provide estimated TOs ($\hat{to}_0$, $\hat{to}_3$, $\hat{to}_6$, and $\hat{to}_9$) for the received PSCCHs. In the V2X environment, the selected number of different local DMRS ($l_0$, $l_3$, $l_6$, and $l_9$) comprises 4 with 4 corresponding cyclic shifts ($n_{cs}$=0, 3, 6, 9) to provide 4 estimated TOs ($\hat{to}_0$, $\hat{to}_3$, $\hat{to}_6$, and $\hat{to}_9$). The four estimated TOs ($\hat{to}_0$, $\hat{to}_3$, $\hat{to}_6$, and $\hat{to}_9$) are preferably determined from:

$$\hat{to}_{n_{cs}} = \frac{N_{FFT}}{2\pi} \cdot \frac{1}{K_s} \cdot L\left(\frac{1}{24-K_s} \cdot \sum_{i=0}^{23-K_s} [y(i)l^*_{n_{cs}}(i)] \cdot [y(i+K_s)l^*_{n_{cs}}(i+K_s)]^*\right)$$

where:
y is a received DMRS
$l_{n_{cs}}$ is a local DMRS with cyclic shift $n_{cs}$
i is a sub-carrier index
$N_{FFT}$ is the FFT length
(•)*: is the complex conjugate and
$K_s$ is a configurable interval.

The interval $K_s$ is configurable such that the correct cyclic shift can be identified automatically after TO compensation and local DMRS correlation. For example, for the embodiment in LTE V2X release, the valid value of $K_s$ is between 4 to 12, inclusively.

In a next step 415, the signal detection module 130 is configured to perform TO compensation using the estimated TOs ($\hat{to}_0$, $\hat{to}_3$, $\hat{to}_6$, and $\hat{to}_9$) to provide TO-compensated received DMRSs ($\tilde{y}_0$, $\tilde{y}_3$, $\tilde{y}_6$, and $\tilde{y}_9$). Each of TO-compensated DMRS is preferably determined from:

$$\tilde{y}_{n_{cs}}(i) = y_{n_{cs}}(i) \cdot \exp(j \cdot 2\pi \cdot (i_0+i) \cdot \hat{to}_{n_{cs}} \cdot N_{FFT}^{-1})$$

where $\tilde{y}_{n_{cs}}$ stands for the TO-compensated DMRS while $y_{n_{cs}}$ stands for the received DMRS. $i_0$ is the starting index in the frequency domain of the current PSCCH.

In the ideal case where there is no noise, the received DMRS is only affected by TO, then the i-th element of the received time-shifted DMRS can be expressed as:

$$y_{n_{CS}}(i) = l_{n_{cs_{org}}}(i) * \exp\left(-j \cdot 2\pi \cdot \frac{TO}{N_{FFT}}i\right)$$

Substituting $y_{n_{cs}}(i)$ into the TO-estimation equation gives:

$$\hat{to}_{n_{cs}} =$$
$$\frac{N_{FFT}}{2\pi} \cdot \frac{1}{K_s} \cdot L\left(\frac{1}{24-K_s} \cdot \sum_{i=0}^{23-K_s} \left[l_{n_{cs_{org}}}(i) * \exp\left(-j \cdot 2\pi \cdot \frac{TO}{N_{FFT}}i\right)l^*_{n_{cs}}(i)\right] \cdot \left[l^*_{n_{cs_{org}}}(i+K_s) * \exp\left(j \cdot 2\pi \cdot \frac{TO}{N_{FFT}}(i+K_s)\right)l_{n_{cs}}(i+K_s)\right]\right)$$

Focusing on only the part inside the angle function and calling it $\varphi$ equals to:

$$\varphi = \frac{1}{24-K_s} \cdot \sum_{i=0}^{23-K_s} [l_{n_{cs_{org}}}(i)l^*_{n_{cs}}(i)]\left[l^*_{n_{cs_{org}}}(i+K_s) l_{n_{cs}}(i+K_s)\right]\left[\exp\left(-j \cdot 2\pi \cdot \frac{TO}{N_{FFT}}i\right) \cdot \exp\left(j \cdot 2\pi \cdot \frac{TO}{N_{FFT}}(i+K_s)\right)\right]$$

The third bracket at the right-hand side can be simplified and taken out of the summation as it is not related to summation index i:

$$\varphi = \frac{1}{24-K_s} \cdot \exp\left(j2\pi \cdot \frac{TO}{N_{FFT}}K_s\right)$$
$$\sum_{i=0}^{23-K_s} [l_{n_{cs_{org}}}(i)l^*_{n_{cs}}(i)]\left[l^*_{n_{cs_{org}}}(i+K_s)l_{n_{cs}}(i+K_s)\right]$$

The part inside the summation can be further simplified according to the orthogonal property:

$$\varphi = \frac{1}{24-K_s}$$
$$\exp\left(j2\pi \cdot \frac{TO}{N_{FFT}}K_s\right) \cdot \begin{cases} \gamma & n_{cs} = n_{cs_{org}} \\ \gamma \cdot \exp\left(j2\pi \frac{n_{cs}-n_{cs_{org}}}{12} \cdot K_s\right) & n_{cs} \neq n_{cs_{org}} \end{cases}$$

where γ represents the amplitude part after the summation.

In the case of using correct $n_{cs}$, then the condition to make a correct TO estimation is that the angle function should not wrap-around. That means:

$$2\pi \cdot \frac{TO}{N_{FFT}}K_s \leq 2\pi$$

In this case, the max value of $K_s$ is bounded by the maximum value of TO, which is given by the maximum length of cyclic shift in the LTE system, i.e., $TO_{max}$=168, which leads to the maximum value of Ks, as an integer, Ks,max=12 when NFFT=2048.

In the case of using the wrong $n_{cs}$, the condition to result in a wrong TO estimation, which will lead to a weak peak in the consequential correlation profile in the next steps, is that the angle function wraps around. That means:

$$2\pi \cdot \frac{TO}{N_{FFT}}K_s + 2\pi \frac{n_{cs}-n_{cs_{org}}}{12} \cdot K_s \geq 2\pi$$

Comparing the TO caused phase accumulation, the phase accumulation caused by the wrong $n_{cs}$ choice is the dominant factor in the summation. So, we can loosen the condition to be:

$$2\pi \cdot \frac{n_{cs}-n_{cs_{org}}}{12} \cdot K_s \geq 2\pi$$

which leads to the lower bound of the $K_s$ to be 4 as follows:

$$K_{s,min} \geq \frac{12}{\min(n_{cs}-n_{cs_{org}})} = 4$$

Then, in step 420, the signal detection module 130 is configured to circularly correlate the TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$) and obtain energy profiles of the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$). In a next step 425, the signal detection module 130 is configured to obtain normalized energy profiles ($z_0$, $z_3$, $z_6$, and $z_9$) of the energy profiles obtained for the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$). The normalized energy profiles ($z_0$, $z_3$, $z_6$, and $z_9$) are obtained by (A): taking the magnitude squared of the energy profiles of the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$) and then dividing by the average of the magnitude squared of the energy profiles. Using (A) is technically unexpectedly beneficial as any non-obvious peaks from the average value, whilst having high absolute energy by themselves, will be not ranked as high peaks after the normalization process.

For each normalized energy profile ($z_0$, $z_3$, $z_6$, and $z_9$), the signal detection module 130 is configured to identify, at step 430, a maximum peak of said normalized energy profile based on peak power level; to compare at step 435 a power value of said maximum peak with a third selected, calculated or predetermined threshold ($Th_2$); and to store or make available, at step 440, the power value of said maximum peak in association with a corresponding cyclic shift ($n_{cs}$) value, if the power value of said maximum peak is greater than or equal to said third threshold ($Th_2$), and preferably in association with a corresponding candidate pair index value. The foregoing steps are performed for each possible cyclic shift ($n_{cs}$) value for each RB candidate pair. The third threshold ($Th_2$) is selected, calculated or predetermined by offline theoretical analysis, simulation analysis, on-site field tests and/or on-line adaptation.

Preferably, the method further includes the steps 440A-C as shown in FIG. 10 comprising: sorting (step 440A) the stored power values for the admitted candidate RB pairs in order of highest to lowest stored power value; selecting (step 440B) a predetermined, selected or calculated subset L of said stored power values starting with the highest power value; and making (step 440C) said selected subset L of highest stored power values and their corresponding cyclic shift ($n_{cs}$) values available for use in a decoding process for the received channel signal. L is a target number of PSCCH candidates to pass to the channel signal processing device 100 for decoding PSCCH and PSSCH PDUs. The target number should be no less than the required number of PSCCH/PSSCH to be conventionally decoded, nor greater than the affordable number of PSCCH/PSSCH to be decoded by the underlying computation capability of the channel signal processing device 100 (sidelink decoder)

The selected subset L of said stored power values, their corresponding cyclic shift ($n_{cs}$) values and their corresponding candidate pair index values are used by the signal detection module 130 to decode a received PSSCH signal to obtain payload data. The selected subset L may be used in subsequent PSSCH/PSCCH decoding procedures.

The foregoing methods of the invention considerably reduce the computational workload of the signal detection module 130 as L<M, i.e. the computationally expensive channel estimation, de-modulation and convolutional coding procedures in a conventional channel signal decoder need only to be performed L times rather than up to X·M times (up to 4M times in a V2X environment). Simulation results indicate that a valid value of L may lie in the range of 10 to 20, which compares very favourably to a value of M=46 (10 MHz) or 96 (20 MHz). This saves on processing cost and simplifies the hardware design compared to conventional channel signal processing devices. The invention provides a PSCCH prescreening scheme with low complexity and acceptable accuracy.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of processing a received physical sidelink control channel (PSCCH) signal carrying control data associated with a physical sidelink shared channel (PSSCH) signal carrying payload data, the method comprising:

performing the following sets of steps (a) and (b):
(a) (i) determining a signal power for a resource block (RB) in a resource grid of said received PSCCH signal carrying control data;
(ii) comparing the determined signal power for said RB with a selected, calculated or predetermined first threshold ($Th_0$);
(iii) identifying RBs in the resource grid having the determined signal power less than the first threshold ($Th_0$) and excluding any such RBs from further processing;
(b) (i) selecting candidate pairs of RBs in the resource grid of said received PSCCH signal carrying control data;
(ii) determining a signal power for each RB in each candidate RB pair in the resource grid;
(iii) for each candidate RB pair in the resource grid, determining a difference in signal power between the RBs comprising the pair of RBs;
(iv) comparing the determined difference in signal power between the RBs comprising the pair of RBs with a selected, calculated or predetermined second threshold ($Th_1$);
(v) identifying any candidate RB pair where the determined difference in signal power between the RBs comprising the pair of RBs is greater than the second threshold ($Th_1$) and excluding any such candidate RB pair from further processing;
wherein the method includes selecting one or more PSCCH candidates by processing only RBs in the resource grid having a determined signal power greater than or equal to the first threshold ($Th_0$) and processing RBs from only candidate RB pairs in the resource grid having the determined difference in signal power less than or equal to the second threshold ($Th_1$) and using the selected one or more PSCCH candidates to decode one or more associated PSSCHs to obtain payload data.

2. The method of claim 1, wherein the method is applied to a device-to-device communications link when station identifier information is unknown or not provided.

3. The method of claim 1, wherein the signal power determined for any RB is determined at said RB's demodulation reference signal (DMRS) and wherein the signal power is determined only for RBs having a DMRS.

4. The method of claim 3, wherein the signal power determined for any RB is determined at orthogonal frequency division multiplexing (OFDM) symbols of said RB's demodulation reference signal (DMRS).

5. The method of claim 4, wherein the candidate RB pairs are selected as consecutive pairs of valid RBs.

6. The method of claim 5, wherein a valid RB comprises an RB in the resource grid not excluded from further processing by the set of steps (a).

7. The method of claim 1, wherein the set of steps (a) is performed prior to the set of steps (b) such that the RBs determined as having a signal power less than the first threshold ($Th_0$) are excluded from the selection of candidate RB pairs for processing according to the set of steps (b).

8. The method of claim 1, further comprising for each admitted candidate RB pair, where an admitted candidate RB pair comprises an RB pair where the determined difference in signal power between the RBs comprising the pair of RBs is less than or equal to the second threshold ($Th_1$), the step of:
performing timing offset (TO) estimation based on a selected number of different local DMRS ($l_0$, $l_3$, $l_6$, and $l_9$) with a corresponding number of cyclic shifts ($n_{cs}$=0, 3, 6, 9) to provide estimated TOs ($l_0$, $l_3$, $l_6$, and $l_9$).

9. The method of claim 8, wherein the selected number of different local DMRS ($l_0$, $l_3$, $l_6$, and $l_9$) comprises 4 with 4 corresponding cyclic shifts ($n_{cs}$=0, 3, 6, 9) to provide 4 estimated TOs ($l_0$, $l_3$, $l_6$, and $l_9$).

10. The method of claim 9, wherein the four estimated TOs ($l_0$, $l_3$, $l_6$, and $l_9$) are determined from:

$$t\tilde{\varepsilon}_{ncs} = \frac{N_{FFT}}{2\pi} \cdot \frac{1}{K_s} \cdot L\left(\frac{1}{24-K_s} \cdot \sum_{i=0}^{23-K_s} [y(i)l_{ncs}^*(i)] \cdot [y(i+K_s)l_{ncs}^*(i+K_s)]^*\right)$$

where:
y is a received DMRS
$l_{ncs}$ is a local DMRS with cyclic shift $n_{cs}$
i is a sub-carrier index
$N_{FFT}$ is the FFT length
$(\bullet)^*$: is the complex conjugate and
$K_s$ is a configurable interval.

11. The method of claim 8, further comprising for each admitted candidate RB pair the step of:
performing TO compensation using the estimated TOs ($l_0$, $l_3$, $l_6$, and $l_9$) to provide TO-compensated received DMRSs ($\tilde{y}_0$, $\tilde{y}_3$, $\tilde{y}_6$, and $\tilde{y}_9$).

12. The method of claim 11, further comprising for each admitted candidate RB pair the steps of:
circularly correlating the TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$); and
obtaining energy profiles of the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$).

13. The method of claim 12, further comprising for each admitted candidate RB pair the step of:
obtaining the normalized energy profiles ($z_0$, $z_3$, $z_6$, and $z_9$) of the energy profiles obtained for the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$).

14. The method of claim 13, further comprising for each admitted candidate RB pair the steps of:
for each normalized energy profile ($z_0$, $z_3$, $z_6$, and $z_9$), identifying a maximum peak of said normalized energy profile;
comparing a power value of said maximum peak with a third selected, calculated or predetermined threshold ($Th_2$); and
storing the power value of said maximum peak in association with a corresponding cyclic shift ($n_{cs}$) value if the power value of said maximum peak is greater than or equal to said third threshold ($Th_2$).

15. The method of claim 14, wherein the method steps are performed for each possible cyclic shift ($n_{cs}$) value.

16. The method of claim 14, further comprising for each admitted candidate RB pair the step of:
storing the power value of said maximum peak in association with the corresponding cyclic shift ($n_{cs}$) value and a corresponding candidate index.

17. The method of claim 16, further comprising the steps of:
sorting the stored power values for the admitted candidate RB pairs in order of highest to lowest stored power value;

selecting a predetermined, selected or calculated subset L of said stored power values starting with the highest power value; and making said selected subset L of highest stored power values and their corresponding cyclic shift ($n_{cs}$) values available for use in a decoding process for the received channel signal.

18. A device for processing a received physical sidelink control channel (PSCCH) signal carrying control data associated with a physical sidelink shared channel (PSSCH) signal carrying payload data, the device comprising:

a receiver configured to receive channel signals, wherein the channel signals include control channel data blocks of a control channel; and a signal detection module configured for detecting control channel blocks of the control channel, wherein the signal detection module includes machine readable instructions stored in a memory and executable by a processor to perform the following sets of steps (a) and (b):

(a) (i) determining a signal power for a resource block (RB) in a resource grid of said received PSCCH signal carrying control data;

(ii) comparing the determined signal power for said RB with a selected, calculated or predetermined first threshold ($Th_0$);

(iii) identifying RBs in the resource grid having the determined signal power less than the first threshold ($Th_0$) and excluding any such RBs from further processing;

(b) (i) selecting candidate pairs of RBs in the resource grid of said received PSCCH signal carrying control data;

(ii) determining a signal power for each RB in each candidate RB pair in the resource grid;

(iii) for each candidate RB pair in the resource grid, determining a difference in signal power between the RBs comprising the pair of RBs;

(iv) comparing the determined difference in signal power between the RBs comprising the pair of RBs with a selected, calculated or predetermined second threshold ($Th_1$);

(v) identifying any candidate RB pair where the determined difference in signal power between the RBs comprising the pair of RBs is greater than the second threshold ($Th_1$) and excluding any such candidate RB pair from further processing;

wherein obtaining payload data includes selecting one or more PSCCH candidates by processing only RBs in the resource grid having a determined signal power greater than or equal to the first threshold ($Th_0$) and processing RBs from only candidate RB pairs in the resource grid having the determined difference in signal power less than or equal to the second threshold ($Th_1$) and using the selected one or more PSCCH candidates to decode one or more associated PSSCHs to obtain said payload data.

19. A method of processing a received physical sidelink control channel (PSCCH) signal carrying control data associated with a physical sidelink shared channel (PSSCH) signal carrying payload data, the method comprising, for each admitted candidate RB pair in a resource grid of said received PSCCH signal carrying control data, where an admitted candidate RB pair comprises an RB pair where a determined difference in signal power between the RBs comprising the pair of RBs is less than or equal to a predetermined, selected or calculated threshold ($Th_1$), the steps of:

performing timing offset (TO) estimation based on a selected number of different local DMRS ($l_0$, $l_3$, $l_6$, and $l_9$) with a corresponding number of cyclic shifts ($n_{cs}$=0, 3, 6, 9) to provide estimated TOs ($l_0$, $l_3$, $l_6$, and $l_9$);

performing TO compensation using the estimated TOs ($l_0$, $l_3$, $l_6$, and $l_9$) to provide TO-compensated received DMRSs ($\tilde{y}_0$, $\tilde{y}_3$, $\tilde{y}_6$, and $\tilde{y}_9$); and circularly correlating the TO-compensated received DMRSs (($\tilde{y}_0$, $\tilde{y}_3$, $\tilde{y}_6$, and $\tilde{y}_9$) and their corresponding local DMRSs ($l_0$, $l_3$, $l_6$, and $l_9$).

20. The method of claim 19 further comprising the steps of:

obtaining normalized energy profiles ($z_0$, $z_3$, $z_6$, and $z_9$) for the circularly correlated TO-compensated received DMRSs ($\tilde{y}_0$, $\tilde{y}_3$, $\tilde{y}_6$, and $\tilde{y}_9$) and their corresponding local DMRSs ($l_0$, $l_3$, $l_6$, and $l_9$); and for each normalized energy profile ($z_0$, $z_3$, $z_6$, and $z_9$):

identifying a maximum peak of said normalized energy profile;

comparing a power value of said maximum peak with a selected, calculated or predetermined threshold ($Th_2$); and, and, if the power value of said maximum peak is greater than or equal to said threshold ($Th_2$), making said power value of said maximum peak in association with its corresponding cyclic shift ($n_{cs}$) value available to a process for decoding the received channel signal.

21. The method of claim 20 further comprising the steps of:

sorting the power values for the admitted candidate RB pairs in order of highest to lowest power value;

selecting a predetermined, selected or calculated subset L of said sorted power values starting with the highest power value; and making said selected subset L of highest power values and their corresponding cyclic shift ($n_{cs}$) values available for use in the decoding process for the received channel signal.

* * * * *